United States Patent
Massuda

(10) Patent No.: US 9,310,579 B2
(45) Date of Patent: Apr. 12, 2016

(54) AERIAL SPLICEBOX FOR FIBER OPTIC CABLES

(71) Applicant: FURUKAWA INDUSTRIAL S.A. PRODUTOS ELÉTRICOS, Curitiba (BR)

(72) Inventor: Marcos Akinori Massuda, Curitiba (BR)

(73) Assignee: FURUKAWA INDUSTRIAL S.A. PRODUTOS ELETRICOS, Curitiba-PR (BZ)

( * ) Notice: Subject to any disclaimer, the term of this patent is extended or adjusted under 35 U.S.C. 154(b) by 140 days.

(21) Appl. No.: 14/256,732

(22) Filed: Apr. 18, 2014

(65) Prior Publication Data

US 2014/0314387 A1    Oct. 23, 2014

(30) Foreign Application Priority Data

Apr. 18, 2013   (BR) .................. 10 2013 009448 0

(51) Int. Cl.
*G02B 6/44*   (2006.01)
*G02B 6/48*   (2006.01)

(52) U.S. Cl.
CPC .............. *G02B 6/445* (2013.01); *G02B 6/4444* (2013.01); *G02B 6/4454* (2013.01); *G02B 6/483* (2013.01)

(58) Field of Classification Search
CPC ....................................................... G02B 6/4446
USPC ................................................. 385/134–137
See application file for complete search history.

(56) References Cited

U.S. PATENT DOCUMENTS

| | | | | |
|---|---|---|---|---|
| 5,434,945 A | * | 7/1995 | Burek ................. | G02B 6/4446 385/134 |
| 5,774,618 A | * | 6/1998 | Jones .................. | G02B 6/4442 385/134 |
| 5,886,300 A | * | 3/1999 | Strickler ............. | G02B 6/4444 174/135 |
| 5,907,653 A | * | 5/1999 | Burek ................. | G02B 6/3801 385/135 |
| 6,314,229 B1 | * | 11/2001 | Sasaki ................. | G02B 6/4444 385/135 |
| 7,239,789 B2 | * | 7/2007 | Grubish .............. | G02B 6/4444 385/135 |
| 7,442,884 B2 | * | 10/2008 | Ball ..................... | H02G 15/013 16/2.1 |
| 8,718,436 B2 | * | 5/2014 | Barnes ................ | G02B 6/3897 385/135 |

* cited by examiner

*Primary Examiner* — Daniel Petkovsek
(74) *Attorney, Agent, or Firm* — B. Aaron Schulman, Esq.; Stites & Harbison, PLLC.

(57) ABSTRACT

An aerials splicebox for optic fiber cables is provided which includes: a base, the peripheral wall which is provided with bottom windows and top windows and an external flange articulating a cover provided with a surrounding flange; a belt to be fitted on said flanges, when situated against each other; a ring-shaped handle having a closed end, hinged in the first end of the belt and a bipartite opposing end which is moveable between an inoperative position and an operating position which is situated against the base and aligned with the top windows; a fastener mounted on a belt in order to press the ring-shaped handle against the base; and a sealing element fixed against the peripheral wall of the base and provided with through openings for optic cable, aligned with the respective bottom windows of the base.

16 Claims, 10 Drawing Sheets

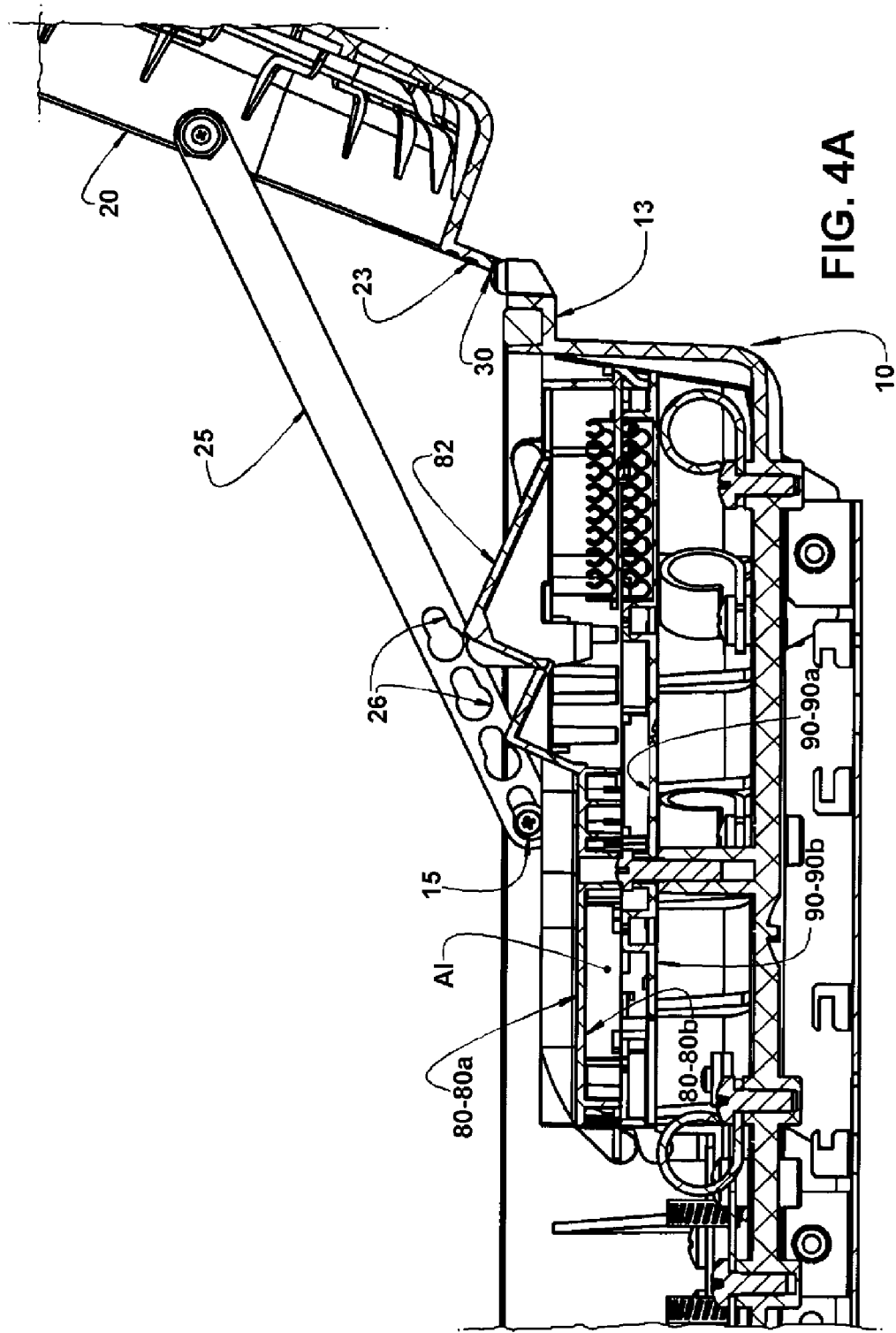

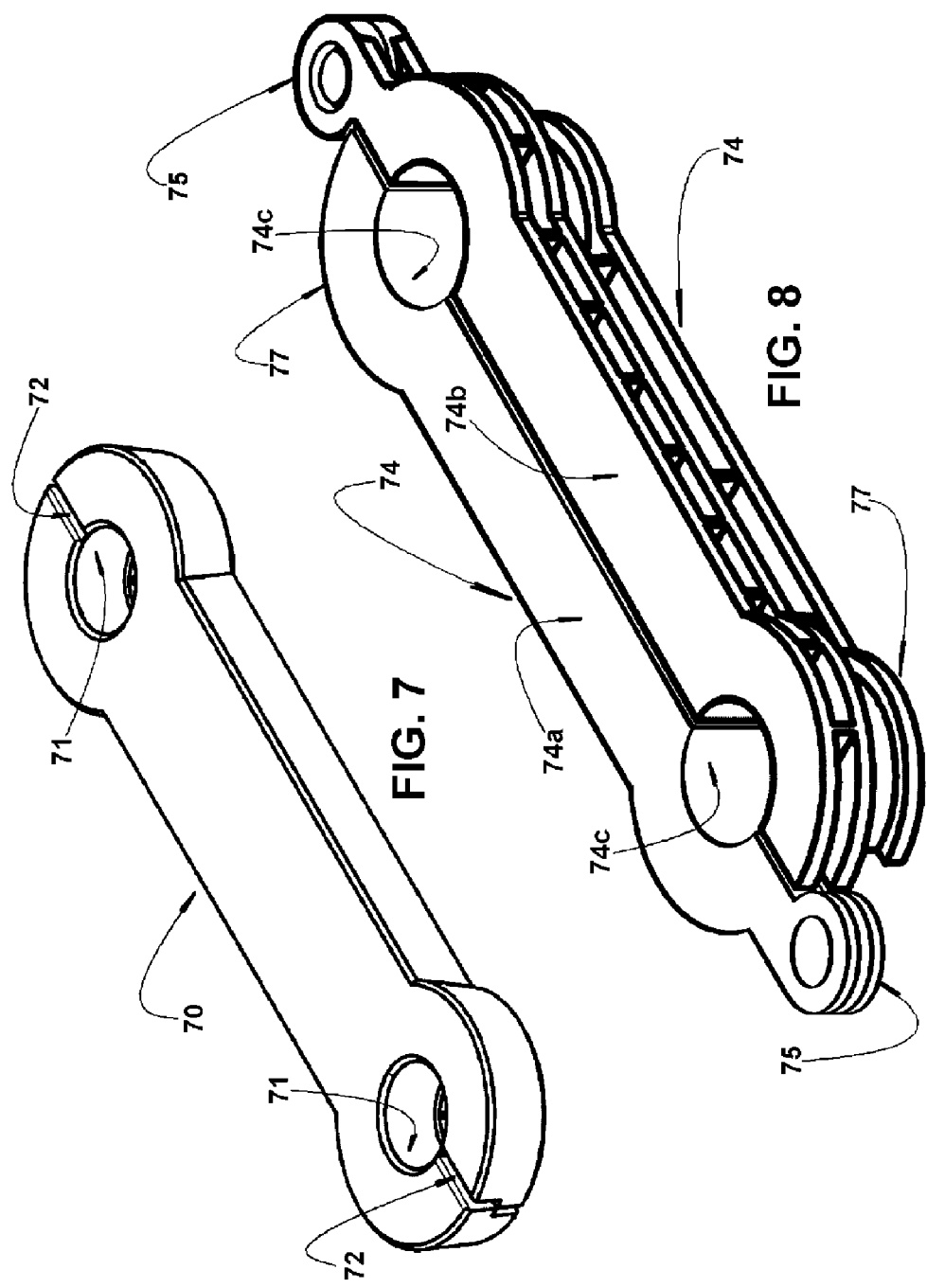

AERIAL SPLICEBOX FOR FIBER OPTIC CABLES

FIELD OF THE INVENTION

This invention relates to the field of optic fiber telecommunications and, more specifically, to an aerial splicebox or optic cable end, which includes several new components in order to facilitate the installing and the handling of optic fibers in it, while it provides architecture capable of significantly reducing its external sizes.

HISTORIC BACKGROUND OF THE INVENTION

Fiber optics telecomm systems employing optic cables and electronic equipment are largely used in the telecommunication industry, for the transmission of large volumes of data and voice signals over long distances and practically without noise generation. Splice points and user activation terminal points are required for such systems.

In a splice point, for instance, all the fibers in an end of a given cable are spliced to the fibers corresponding to a new cable extension, in order to continue with the optic cable, necessary to reach one new splice point or a user activation terminal point.

However, in a user activation point, the optic cable fibers, which reach the aerial terminal box, may be fully or partially connected to the drop cables, which are destined to the transport of the optic signal for the end users of the network. The optic cable fibers, which are not connected to a respective drop cables, may pass through the box, unaltered or spliced to a new cable extension, in order to proceed toward a new splice point or user activation point.

In both points, the splice point or the user activation point, the optic fibers are exposed by removing a given length of protection sleeve of the optic cables, in order for them to be properly spliced to the respective multiple cable or drop cables extensions and protected inside of a splicebox or user activation terminal.

The splicebox may be built to serve a given splice point, and it may end up with larger sizes in order to accommodate a larger amount of optic fibers, in the case of splice points with a high number of optic fibers, or be specially designed to operate, in full or partially, such as user activation terminal boxes.

An user activation terminal box, usually simply called a terminal box, usually presents several features which constitute functions to facilitate the activation work of each final user of the optic network covered by the box, since such work is performed in a given number of times which varies in accordance with the clients' requirement, up to a total of 8 or 16, also depending on the configuration of the optic accessories used. Since each activation may require considerable time and enable the occurrence of damage to other connections previously performed in the optic terminal box, it is desirable that the product has an architecture which facilitates the work to be performed and which ensures the safety of the work already done. Many generic and flexible spliceboxes, which it may be used both in splice points and in user activation points, do not allow the effective streamlining and the desirable safety of splice works for extension cables and for drop cables for user activation.

The known boxes present a more worked cable entry structure, in order to ensure a higher level of protection and an simplified fiber organization architecture in a single environment, for a large counting of optic fibers, which affects the safety of the splices already effective at the time of the performance of the connections to the drop cables required due to the demand to be met by a given box with functions at least partially as a terminal box. With the popularization of optic fiber services going to the user house (types of network called FTTx) and the potential for clients signing up for such services, several companies have prepared for a new reality of this market niche, and studies on how to meet the needs of a very large number of clients have shown the need for a drastic reduction of the time spent in each user activation, since the operational difficulties found are too great and to which problematic factors are added, such as lack of labor force trained for the work and shortage of proper equipment for more complex installations. The labor force-related difficulty also dooms cases in which reworks are necessary or routine, hence the fact that it is crucial to maintain the safety of the connections already performed.

Due to the aforementioned factors, it becomes desirable, and even required, to have technical solutions for user activations-clients, which enable a quick, user-friendly and safe installation, capable of reducing the probability of rework and maintenance in a connection previously performed in a box from which drop cables for user activation shall be later derived.

Said factors make impossible the use of more generic models, since they present an internal architecture that is very simple and prone to creating problems in connections performed previously, when the interior of the box is accessed several times, for instance, for a drop cable connection. Generic boxes present, as another limiting factor for their application in user activation points, a level of protection against weather, which is also generic, which many times is redundant in aerial networks and ends up getting in the way o the activation, since it makes it harder to open the box and to use the cable entries in order to favor a more reliable sealing.

For most applications, the size of the terminal boxes must be as small as possible, due to the space available in the telecom networks present in large urban centers and which are normally congested with other optic network and of metallic network products, some active products and other already inactive products which are still allocated in such a way as to take space on the post or in the cordage. The reduced size is also important for special cases in which the space on the post is granted only to products of considerably compact sizes.

From the engineering point of view, a smaller product also presents a smaller cost, which makes it more attractive for the market, which is considerably focused on price due to the high investment which optic network projects still require.

SUMMARY OF THE INVENTION

In view of the aspects discussed above, this invention has the objective of providing an aerial splicebox for optic fiber cables to be installed in post or cordage, presenting, due to the architecture of its components, a substantial reduction in their external size measurements, easier opening, easier closing, and easier entry and accommodation of the optic cables and capable of minimizing the user activation time.

The invention has also the additional objective of providing an aerial splicebox, as defined above and capable of efficiently protecting the splices or connections previously performed in it.

In accordance with the present invention, a splicebox is provided that includes, in a non-electricity conductive material: a base with a peripheral wall provided with a pair of bottom windows and top windows and incorporating an external flange, usually interrupted in the region of the peripheral wall provided with the pair of bottom windows; a cover with a peripheral skirt which incorporates, externally, a surrounding flange; and the hinge connecting the cover to the base in a region opposed to that in which the bottom and top windows are provided, in order to allow the angular movement of the cover from the closed position, with the surrounding and external flanges sitting against each other, and at least an open position in relation to the base.

In order to ensure an airtight closing for the splicebox, to still be provided: a belt with an U-section, to be tightly fit over the flanges, both external and surrounding, when sited against each other, said belt having a first and a second end positioned in opposing sides of the top windows; a ring-shaped handle, having a closed end, hinged in the first end of the belt, and a bipartite opposing end, and the handle being angularly moveable between the inoperative position, away from the top windows, and the operating position sited against the base and aligned with the top windows; and a fastener mounted on one of the parts of belt and of ring-shaped handle, for locking, liberally, the ring-shaped handle against the base.

The tray also includes at least one sealing element provided with at least one through opening aligned with the respective lower window of the base, in order to allow an airtight passing for an optic cable.

The construction proposed by the invention enables a small-sized splicebox to contain a high number of splices of optic fiber cables and of drop cable connection, organized in a practical way, with the splice region and the connection region easily accessible by extremely simple opening and closing operations of the box.

The boxes may also articulate, inside the base, a connector tray provided with connectors disposed in such a way as to considerably simplify the connection operations of the drop cables with the box already installed in a post or in a cordage. It may also be provided, from below the connector tray, a splice tray provided with means to facilitate the accommodation of the optic cables and of its splices or derivations for the connectors for the drop cables.

BRIEF DESCRIPTION OF THE DRAWINGS

Next, the invention shall be described based on the annexed drawings, given as examples of a realization of the invention and on which:

FIG. 4A represents a partial view similar to that of FIG. 4, but illustrating the cover portion of the splicebox in the open condition on a base;

FIG. 7 represents a perspective view of a sealing element constructed in a single piece and presenting two through openings; and FIG. 8 represents a perspective view of a pressing element constructed in two pieces which complement each other in order to press the sealing element against the base.

DETAILED DESCRIPTION OF THE INVENTION

Figure 4:
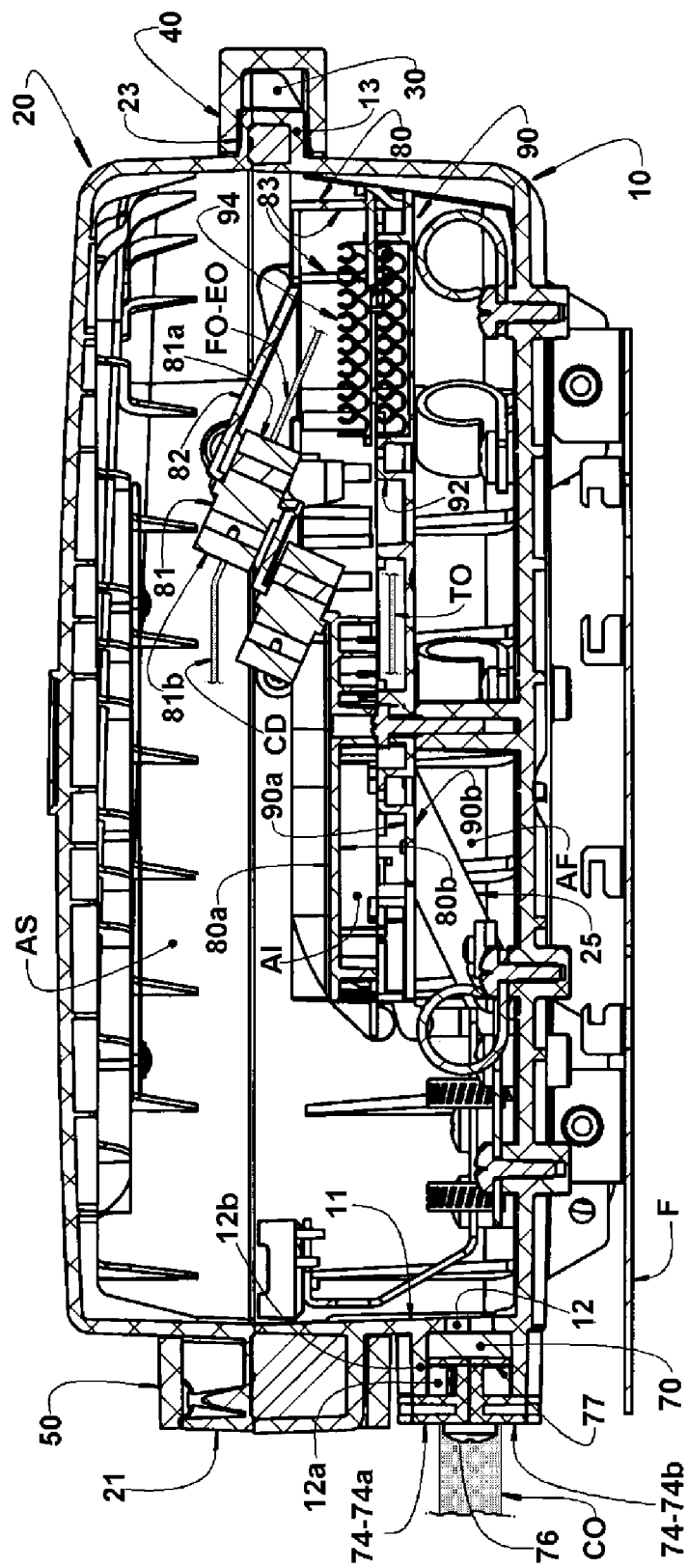
FIG. 4 represents a longitudinal cut view of the box already closed and locked, and said cut was made according with line IV-IV in FIG. 3C.
Figure 5:
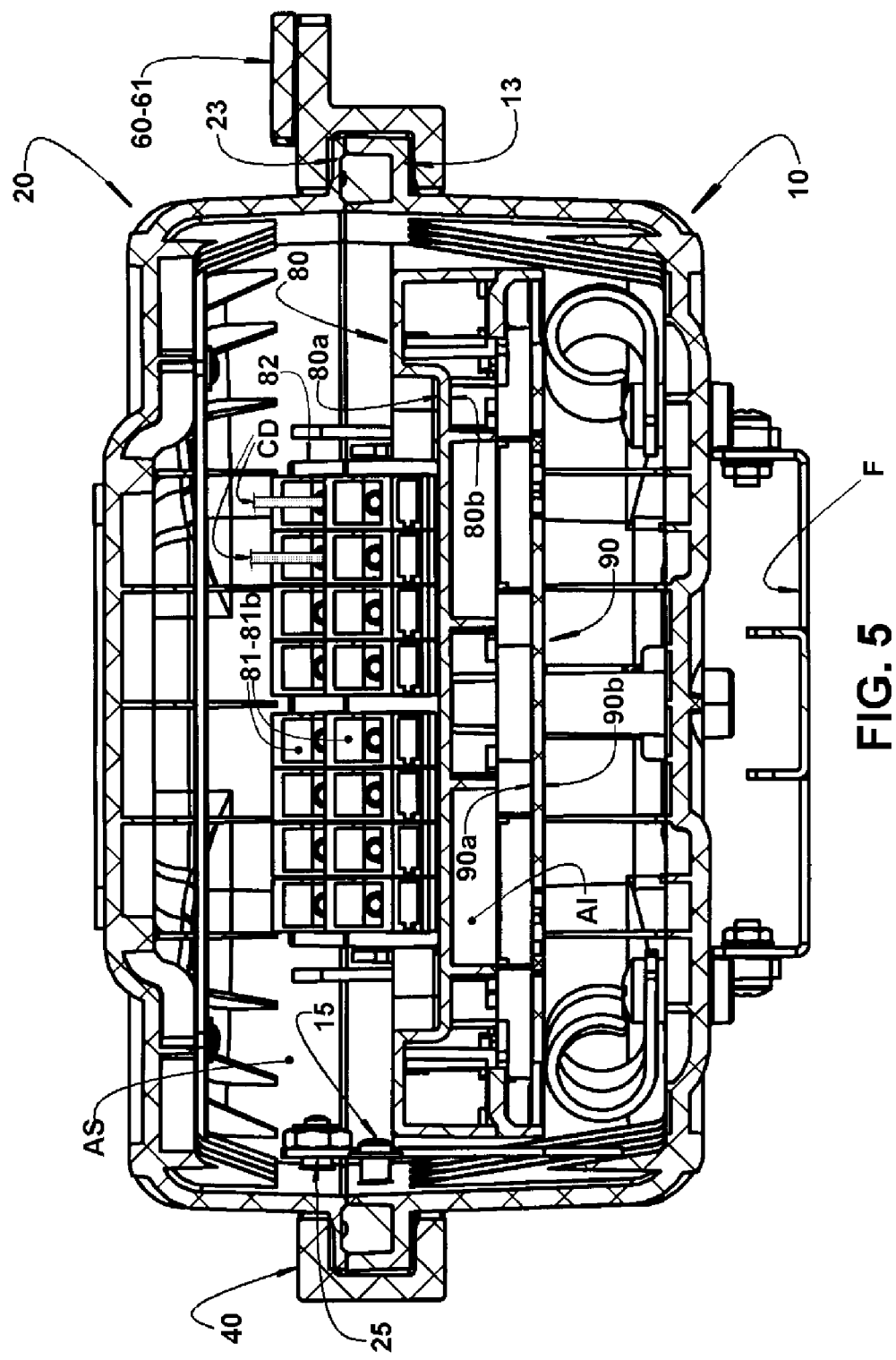
FIG. 5 represents a transversal cut view of the box already closed and locked, and said cut was made according with line V-V in FIG. 3C.

As illustrated in the drawings, the aerial splicebox discussed herein includes a base 10 and a cover 20, both made in non-electricity conductive material, with base 10 incorporating, in a single piece, a peripheral wall 11 which is provided with a pair of bottom windows 12 (see FIG. 4) for the passing of the respective optic cables CO and of several top windows 14 opened to the top edge of the peripheral wall 11 of the base 10, and through which they may be easily removed and for the placement of different drop cables CD.

In the illustrated construction, the bottom windows 12 are formed inside of a housing 12a formed externally to the base 10 and inside of a peripheral lid 12b which protrudes out from the peripheral wall 11 of the base 10.

Figure 6:
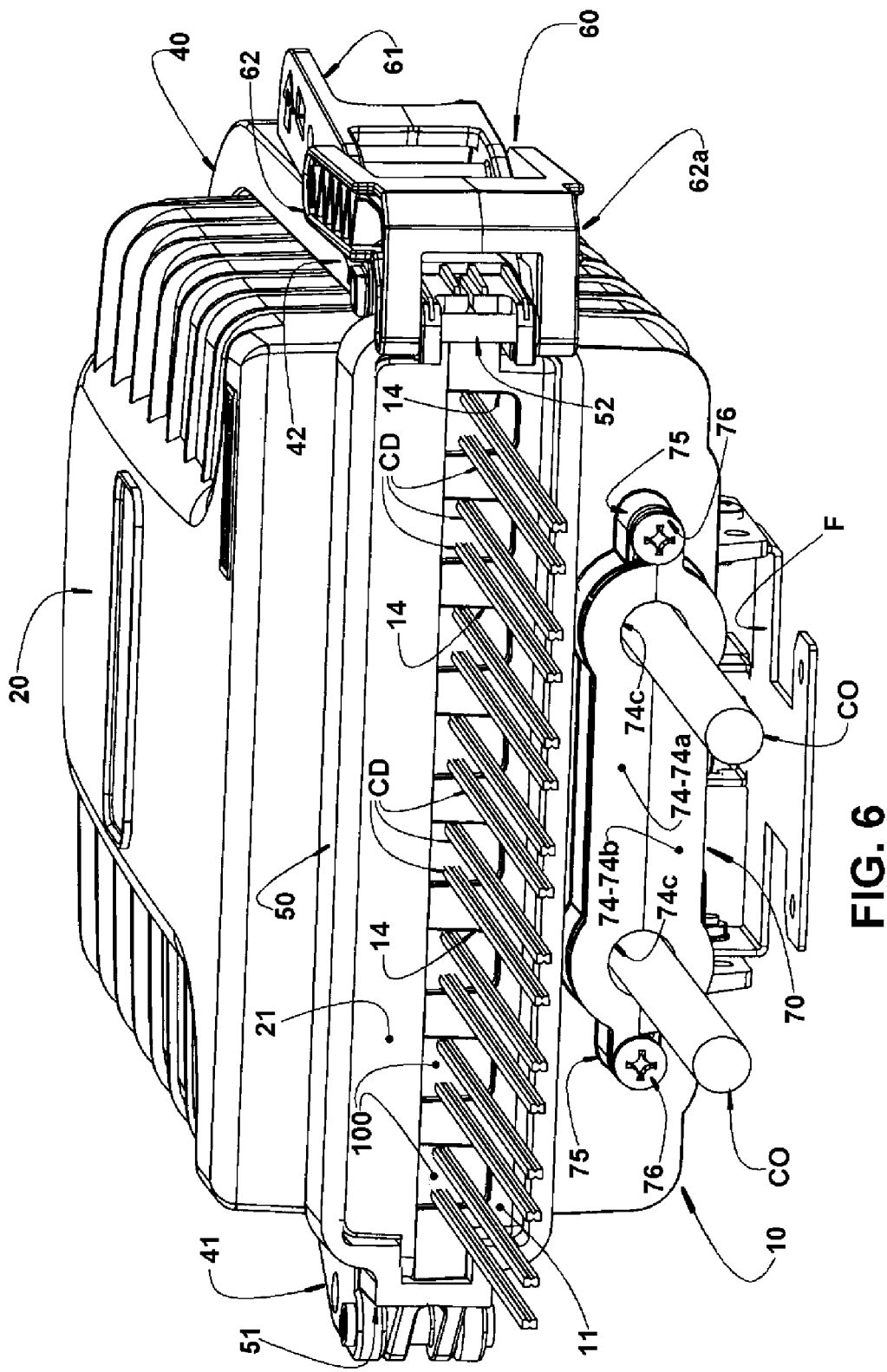
FIG. 6 represents a perspective view of the splicebox in the closed and locked condition, also illustrating a pair of optic cables passing through the respective exit holes of the sealing element already fixed to the peripheral wall of the base and several drop cables passing through the top windows of the base.

The peripheral wall 11 incorporates the external flange 13, usually interrupted in the region of the peripheral wall 11 provided with the pair of bottom windows 12 (see FIG. 6).

The cover 20 incorporates a peripheral skirt 21 which also externally incorporates the surrounding flange 23 and which is connected to the base 10, in a region opposed to that of the bottom windows 12 and top windows 14, by a hinge 30 which enables the cover 20 to be angularly moved from the closed position, with the surrounding flange 23 and the external flange 13 sited against each other, and at least one open position in relation to the base 10 and in which enables the access to the interior of the box by the of splice and connection operator.

In the illustrated construction, the hinge 30 of the cover 20 to the base 10 is defined in respective confronting portions of the surrounding flange 23 of the cover 20 and the external flange 13 of the base 10.

The aerial splicebox discussed herein presents a closing system comprised of four main parts, made of non-electricity conductive material, usually plastic, which are used to make the closing of the box in a very simple and practical, requiring no undesirable effort from the installer and no special tools.

In accordance with the present invention, the closing system includes a belt 40, with section transversal shaped like a sideways "U", to be tightly fit over both the external flange 13 and the surrounding flange 23, when situated against each other, at the time of the closing of the cover 20 against the base 10.

In the configuration illustrated, the base 10 and the cover 20 present a substantially rectangular contour, with a belt 40 presenting a "U" shaped contour involving three edges of the splicebox and having a first end 41 and a second end 42, positioned in opposing sides of the top windows 14 of the passing of the drop cables CD.

The closing system also includes the ring-shaped handle 50, having a closed end 51, with hinge at the first end 41 of the belt 40, and a bipartite opposing end 52. The ring-shaped handle 50 may thus be angularly moved between the inoperative position, away from the top windows 14, and the operating position sited against the base 10 and aligned with said top windows 14.

In order to provide the locking at the closing of the box, it is also provided a fastener 60 which it may be mounted on the belt 40 or on the ring-shaped handle 50, for it to be moved between the unlocked position, in which it may be engaged and disengaged in relation to the other from said parts, and the locked position, engaged with said other part and in which it presses the ring-shaped handle 50 against the base 10.

Figure 3A:
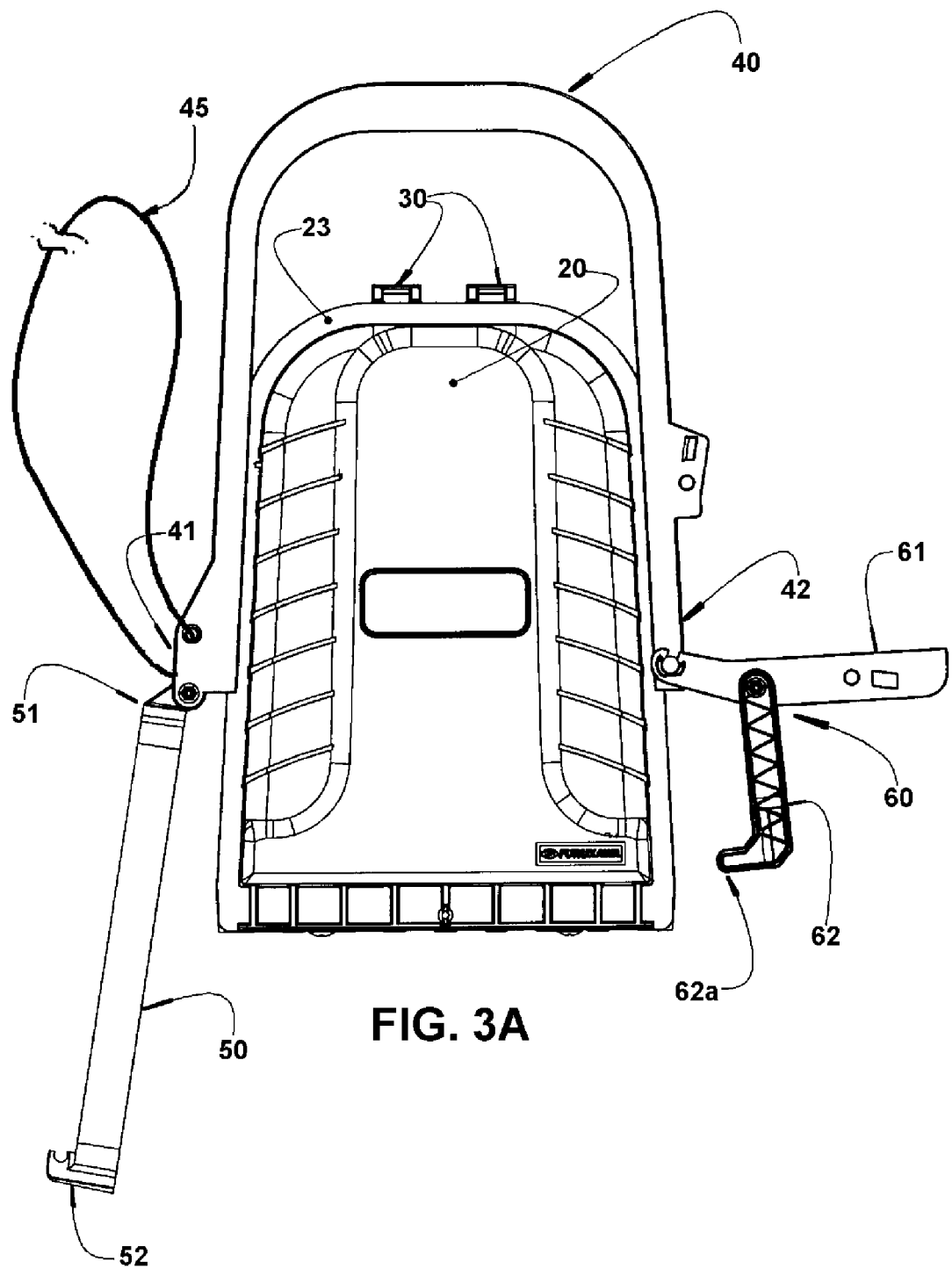
FIGS. 3A, 3B and 3C represent blueprint views of the splicebox with the locking device in a condition of beginning of assembly in the box, in a final condition of assembly and in a condition of final locking, respectively.
Figure 3B:
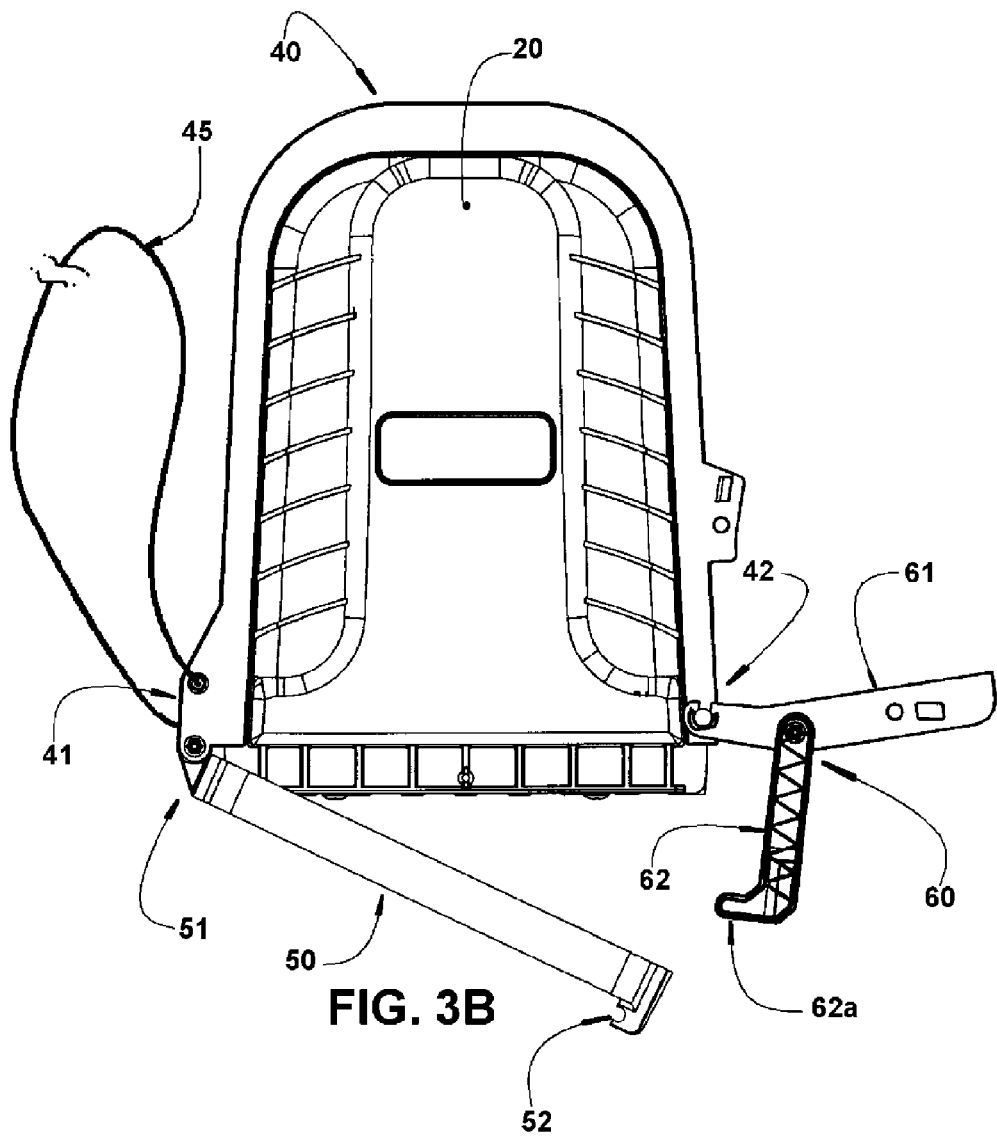
Figure 3C:
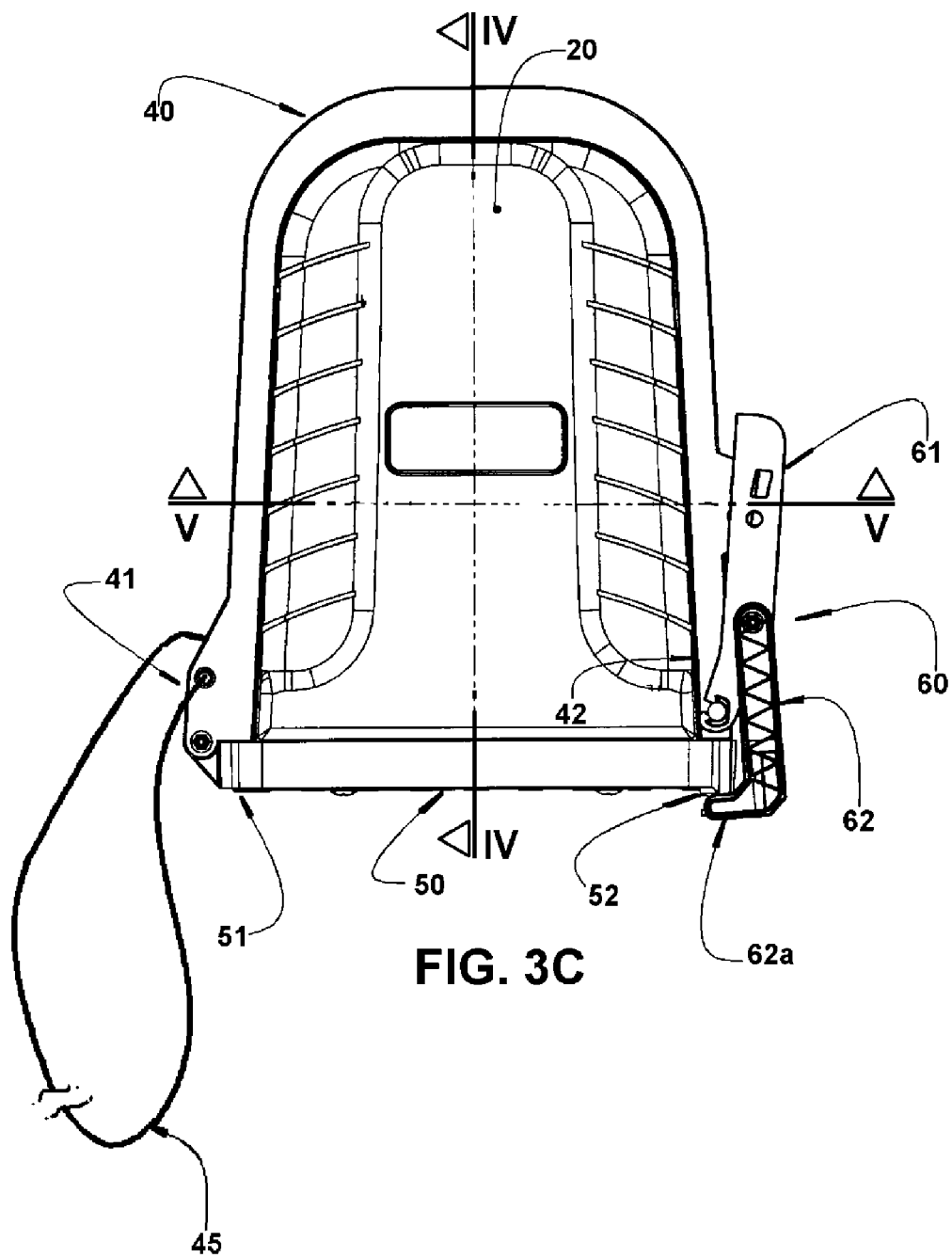

The closing belt may be open in three simple steps, as shown in FIGS. 3A, 3B and 3C. It is also capable of providing extra protection against entry of water when the box is installed in vertical position, usually with the bottom windows 12 and top 14 turned downward or even sideways, ensuring sufficient pressing in the sealing rubbers (not illustrated), for the box to be properly sealed in aerial (non-submerse) environments.

The closing system was adapted for a small-sized box, with tilting cover 20 (cover not fully removable which rotates around a hinge axle fixed in a region of the box opposed to that in which the bottom windows 12 and top windows 14 are provided).

Said adaptation includes the division of the ring-shaped handle 50 in two parts, in the region of its 52, in order to allow for the drop cables CD to be easily introduced inside of the ring-shaped handle 50, at the time of its installing in the splicebox. The drop cables CD may be inserted in or removed from inside the ring-shaped handle 50, through the opening resulting from the bipartition of its opposed end 52.

In order for the belt 40 to not fall off during of box opening and closing operations, a cord 45 is provided, usually made of synthetic material, which attaches the belt 40 to the base 10, as shown in FIGS. 3A, 3B and 3C.

As illustrated, the fastener 60 may include an articulated lever 61 in the region of the second end 42 of the belt 40 and which articulates, medially, the end of a locking arm 62 having a free end 62a to be engaged to the bipartite opposed end 52 of the ring-shaped handle 50, in such a way as to press the latter against the said second end 42 of the belt 40 when the lever 61 is moved to the locking position illustrated in FIG. 3C.

As it may be noted, the cover 20 opens, from above, with the hinge 30, making the interior of the box accessible to the operator. For the cover 20 to remain open without closing accidently and causing any damage to the work being performed, a metal rod 25 is provided, with round corners and holes 26 in one of the ends, herein called free end, which may be used for support in a protuberance 15 of the base 10. Only one hole is used at a time, and several holes 26 enable the cover 20 to remain open in different angles, a very useful feature, considering that the box must be installed in posts, which may be occupied by other elements which make the opening of the box difficult.

The splicebox discussed herein also includes at least one sealing element 70, obtained in polymeric material, usually rubber, with an oblong shape and provided with at least one through opening 71 for the passing of the respective optic cable CO. In the construction illustrated, see especially FIGS. 7 and 8, it is provided a sealing element 70 (double grommet) in a single piece, with an elongated oblong shape, and presenting a pair of through openings 71 and is designed to be fitted inside of the housing 12a of the base 10, having its through openings 71 aligned with the bottom windows 12 of the base 10, in order to allow for the tight-fit passing of a optic cable CO through each set of through opening 71 and lower window 12. In order to facilitate the adaptation of the sealing element 70 around the optic cables CO, each one of the through openings 71 is radially connected to the exterior of the sealing element 70 by a respective slit 72.

In order to ensure a safe airtight sealing in the entry of the pair of optic cables CO inside the base 10, it is also provided a pressing element 74, preferably constructed in material non-electricity conductive rigid, for instance, a polymer and formed by two symmetrical parts 74a, 74b, sited and locked, one against the other along the junction line which severs the geometric axle of the two bottom windows 12. The two symmetrical parts 74a, 74b of the pressing element 74 define, jointly, a format provided with two holes 74c aligned with the through openings 71 of the sealing element 70 and with the bottom windows 12 of the base 10.

Each one of the two symmetrical parts 74a, 74b of the pressing element 74 has its region peripheral external sited against the front edge of the peripheral lid 12b of the housing 12a of the base 10. Each one of the two symmetrical parts 74a, 74b, incorporates, in one of the ends, the perforated ear 75, in order to allow the passing of a screw 76 for the fixation and tightening of the pressing element 74 against the peripheral wall 11 of the base 10.

Figure 1:
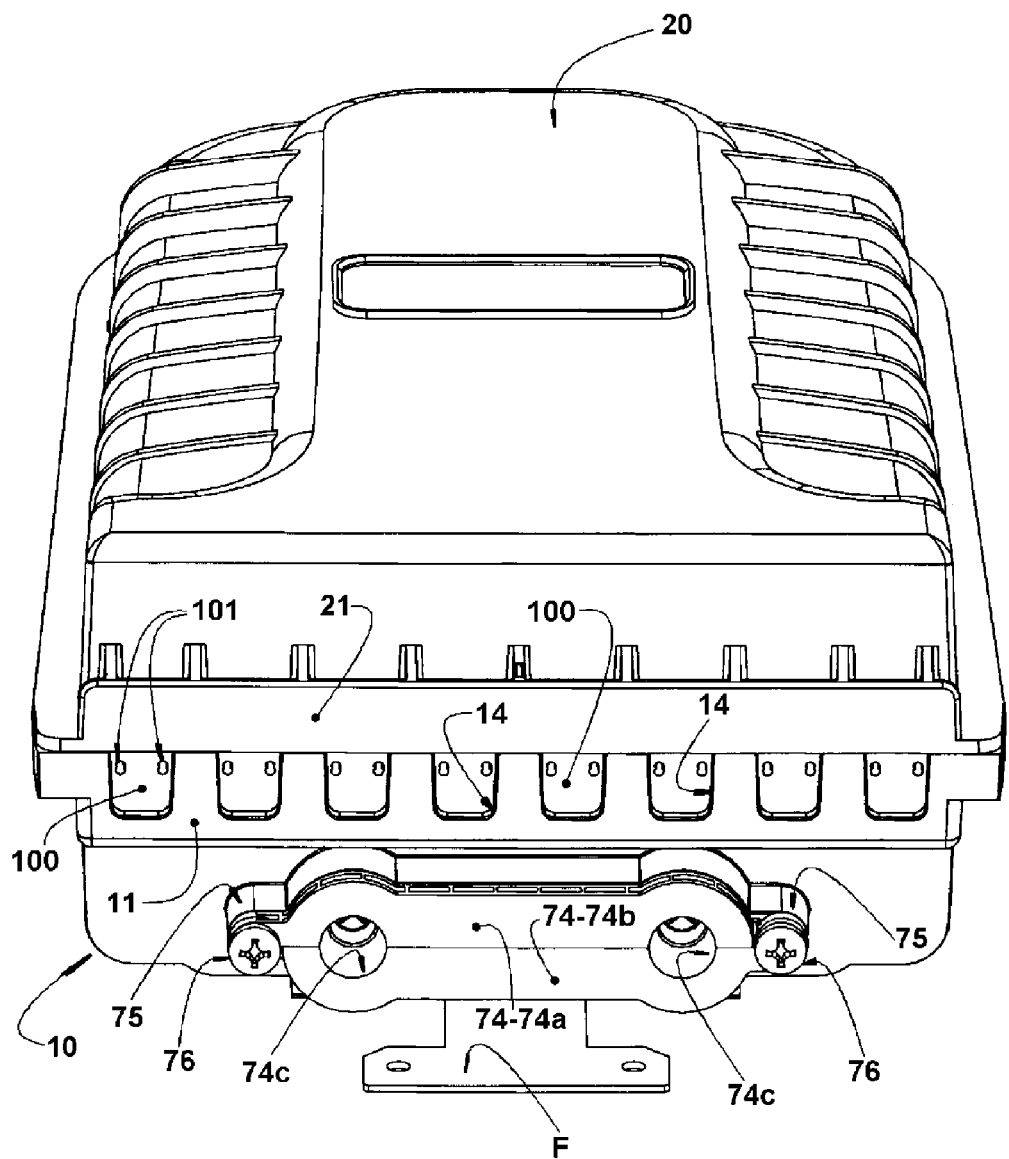
FIG. 1 represents a perspective view of the splicebox of the invention, with its cover portion in the closed condition on a base, but still not provided with the locking set defined by the belt, the ring-shaped handle and by the fastener.
Figure 2:
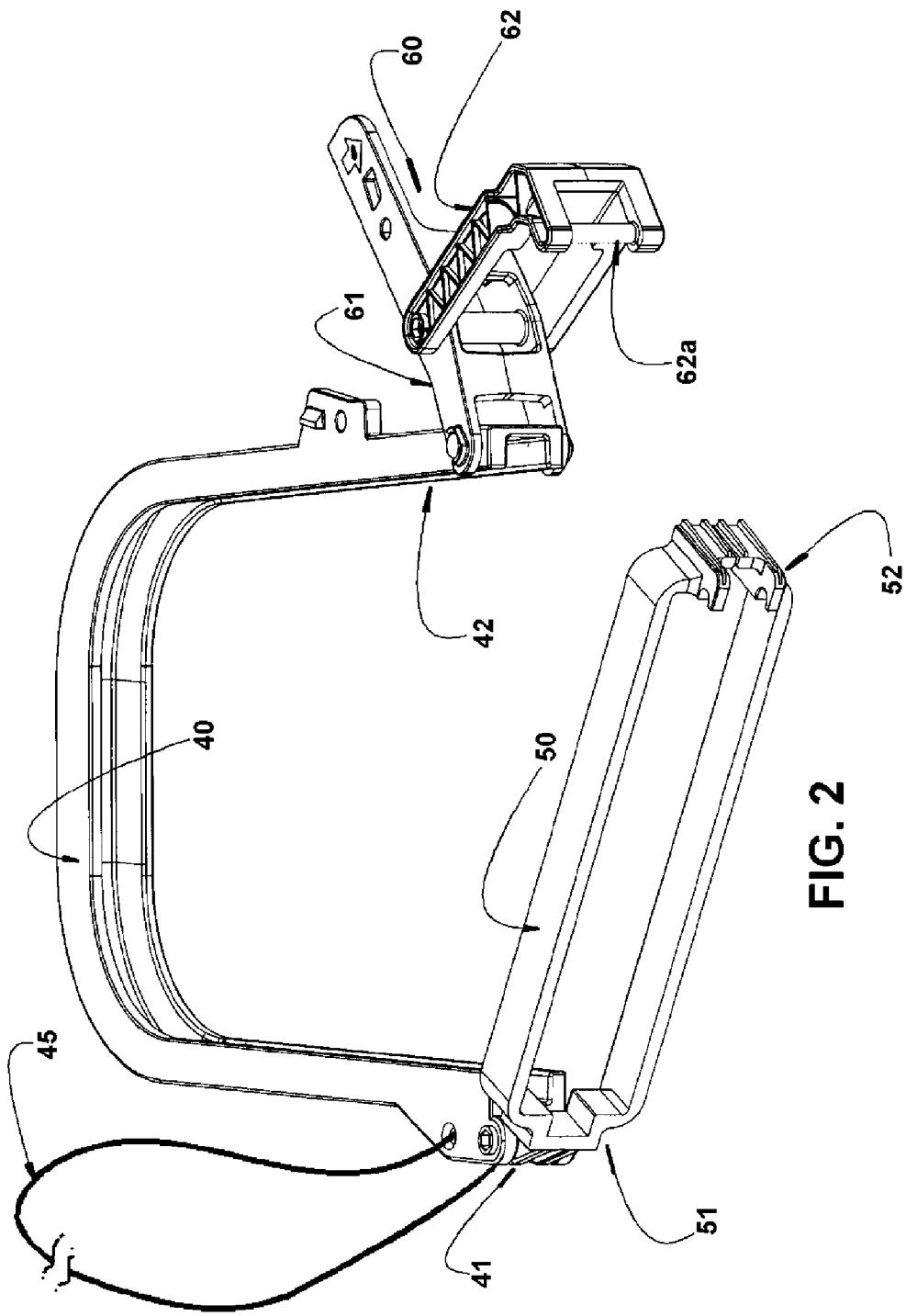
FIG. 2 represents a perspective view of the set formed by the belt, by the ring-shaped handle and by the fastener, with the ring-shaped handle in the inoperative condition and with the fastener in the unlocked position and disengaged in relation to the ring-shaped handle.

Each one of the symmetrical parts 74a, 74b of the pressing element 74 incorporates, in the internal side, a shoe 77 in high relief and placed along the junction line between the two parts, in such a way as to press the sealing element 70 against the portion of the peripheral wall 11 of the base 10 which defines the bottom of the housing 12a, enabling that the sealing element 70 is forced to deform elastically in expansion, and pressed around each one of the optic cables CO, enabling the obtaining of the adequate sealing of this region of entry and exit of optic cables CO. As already mentioned above, the drop cables CD are removed from the splicebox through the top windows 14, which, as illustrated in the FIGS. 1 and 6, receive in them the fitting tight of grommets 100 made of polymeric material, for instance rubber, each one of said grommets 100 and provided with passing orifices 101, associated with top slits (not illustrated), which allow the passing orifices 101 to be open from the top of the respective grommets 100, for the airtight passing of respective drop cables CD. The passing orifices 101 are open for the top housing AS of the splicebox.

The ring-shaped handle 50 is configured in order for the top windows 14 to have their contour contained within the internal contour of the ring-shaped handle 50, when it is moved to its operating position.

In the construction that is preferred and illustrated, the holes 74c of the pressing element 74 are formed by respective portions of hole defined, each one, in one of the two symmetrical parts 74a, 74b of the pressing element 74. The holes 74c of the pressing element 74 are disposed according with two alignments separated from each other length-wise of the spliceboxes, while the top windows 14 are positioned in a higher level and open to the top edge of the peripheral wall 11. This distribution enables a more adequate distribution of the optic cables CO, of their splices and of the drop cables CD inside of the splicebox.

In a constructive way, base 10 articulates in it a connector tray 80 having its front face 80a turned to the cover 20 and the back face 80b turned to the interior of base 10. The connector tray 80 carries several connectors 81, each one presenting an terminal entry 81a, placed in the back face 80b, in order to receive a optic fiber FO derived from the optic cable CO, and an exit terminal 81b, placed in the front face 80a, in order to receive the fitting of the respective drop cables CD to be derived from the box and sent to a user.

As illustrated, the connectors 81 are positioned tilted in relation to the connector tray 80, with the exit terminals 81b turned to the top windows 14 and to the cover 20.

Thus, the invention presents a interchangeable module, defined by the connector tray 80, which may be mounted on the base 10 to enable an installing modality in which optic connectors 81 are used to the instead of splices to perform the activation of the clients-users. In the constructive form illustrated, the connector tray 80 articulates a small plate 82, carrying, in respective perforated housings, a set of optic connectors 81, which are positioned behind and above the same set of optic connectors 81. Preferably, both sets of optic connectors 81 have a maximal capacity of 16 optic adapters of the type SC. As already mentioned, the optic connectors 81 are placed in tilted position, providing internal space saving and easy access to the operator, which is further facilitated by the possibility of angular motion of the plate 82 in relation to the connector tray 80 and to the other set of optic connectors 81.

The connector tray 80 enables the installer realize a activation of each user via a simple opening of the cover 20 and of a simple fitting, to a respective optic connector 81, of drop cables CD, which may be defined by a optic fiber cable non-divided and directed to a specific user.

In these operations of drop cable connection CD to each respective connector 81, the installer does not need to access the region of the box defined between a connector tray 80 and the bottom of the base 10, which contains important optic accessories which must not suffer disturbances after its installing and accommodation.

The back face 80b of the connector tray 80 incorporates housings 83, for the accommodation and organization of optic fibers FO, limiting the curvature of said optic fibers, and grooves (not illustrated) which enable the fitting of splices or of optic dividers, depending on the features of the installing to be served by the splicebox. The connector tray 80 works as a kind of cover for the back region, protecting the more fragile content of the splices, divisions and optic connections and defining the surface which shall be visible for the installer responsible for the activation of the end client via the respective drop cables CD which may be defined by a optic fiber.

The splicebox discussed herein 80 can perform, according with the aforementioned, the accommodation of several components and optic accessories in a structure made of few pieces and in a considerably compact way.

The base 10 may also articulate in it a splice tray 90 having a front face 90a, turned to the connector tray 80 and carrying means of accommodation 92 for the optic fibers FO, and a back face 90b turned to the interior of the base 10.

The splice tray 90 enables the accommodation of the splices and the organization of the optic fibers FO within the splicebox. The splice tray 90 is designed to take the maximal advantage of the technical features of the splicebox, presenting a format which completely fills the available area, maximizing the surface to house the optic fibers FO, at the same time it enables the crossed entry of optic elements in it, enabling the tray to be tilted in relation to the other, without causing steep curvatures in the optic fibers FO.

The splice tray 90 of said invention, in addition to protecting optic elements which are found under its back face 90b and must not be accessed after its installing. It also presents a set of rubber pieces 94 which allow the accommodation of up to 16 splices and a fixation system which enables the connector tray 80 to be mounted on a splice tray 90, without causing an increase in the occupation of space in the other directions. The feature not observed in other splice trays 90 is the distribution of the hooks for performance of rotation of the trays which, in this case, are provided in the lower side ends. This feature enables a better usage of space, leaving a region central free of impediments for the guiding of the optic fibers. As a result, more optic fibers may be affixed in the region lower of the base 10.

In order to perform the management of the internal space occupied by the different cables within the box internal, the drop cables CD and the external optic cables CO are separated in different planes, with the main optic cables CO in the lower plane, in a bottom housing AF defined between the back face 90b of the splice tray 90 and the bottom of the base 10 and for the interior of which the bottom windows 12 of the base 10 are open, and with each one of which the through openings 71 of the sealing element 70 are aligned, as well as the holes 74c of the pressing element 74.

Each optic tube TO, separated from the optic cable CO which enters the splicebox, has its optic fibers FO connected, by respective splices (not illustrated), to the respective optic extensions EO, installed in a intermediary housing AI, defined between the connector tray 80 and the splice tray 90, and provided with a connector end to be coupled to the terminal entry 81a of the respective optic connector 81.

The drop cables CD may then be placed in a higher plane, complying with the logic of the order of assembly of the box, since the drop cables CD are installed last, so they must be located in a more accessible plane, i.e., in a top housing AS, defined between the front face 80a of the connector tray 80 and the cover 20 and to the interior from which the passing orifices are open 101 of the grommets 100 fitted in the top windows 14.

As one can see in the description above and by the drawings, the connector trays 80 and the splice trays 90 have their geometric hinge axles placed inside the base 10 and parallel to the hinge axle of the cover 20 to the base 10.

This spatial organization enables the product to have a reduced width, without compromising the space between the of the drop cable entries, which is an important space, since it separates one cable from the other, reducing as chances of a new activation compromising another activation already performed. This separation between planes and between the drop cables CD may be obtained in several ways.

The splicebox discussed herein may receive, in the external part of its back wall, the adequate ironwork F configured to enable an easy installing in posts or even in cordages.

Despite the fact that only one configuration of the aerial splicebox under examination is illustrated herein, it must be understood that alterations can be made in the form and distribution of the components, without violating the construction concept in the claims which accompany this report.

The invention claimed is:

1. An aerial splicebox for optic fiber cables, comprising: a base having a peripheral wall provided with bottom windows and top windows and incorporating an external flange; a cover incorporating a surrounding flange and articulated with the base, in a region opposed to the bottom windows and top windows, by a hinge for it to be moved between the closed position, with the surrounding flange and external flange sited against each other, and at least one open position; a belt with an U-section, to be fitted over the external flange and surrounding flange, with a closed cover, and having a first end and a second end, positioned in opposing sides of the top windows; a ring-shaped handle, having a closed end, with the hinge at the first end of the belt, and a bipartite opposing end, the ring-shaped handle moveable between an inoperative position, away from the top windows, and an operating position sited against the base; a fastener mounted on one of the parts of belt and a ring-shaped handle for locking, liberally, the ring-shaped handle against the base; and at least one sealing element, provided with at least one through opening aligned with a respective lower window of the base, in order to allow an airtight passing of a optic cable.

2. An aerial splicebox, in accordance with claim 1, wherein the top windows have their contour contained within the internal contour of the ring-shaped handle, when it is moved to its operating position.

3. An aerial splicebox, in accordance with claim 1, wherein the fastener is moveable between a unlocked position, in which it may be engaged and disengaged in relation to the other one of said parts of belt and a ring-shaped handle, and a locked position, engaged with said other part and on which it presses the ring-shaped handle against the base.

4. An aerial splicebox, in accordance with claim 1, wherein it has a through opening which is radially connected to the exterior of the respective sealing element by a slit.

5. An aerial splicebox, in accordance with claim 1, further comprising a pressing element formed by two parts, sited and locked, against each other, along the junction line which severs the geometric axle from the bottom windows and jointly defining holes, each aligned with the respective through opening of the sealing element and with the respective lower window of the base, with said pressing element incorporating in each end a perforated ear for the passing of a fixation screw for the fixation and tightening of the pressing element against the peripheral wall of the base.

6. An aerial splicebox, in accordance with claim 5, wherein each one of the two symmetrical parts of the pressing element incorporates in the internal side a shoe in high relief and placed along the junction line between the two parts, in such a way as to press the sealing element against the portion of peripheral wall of the base and around each respective optic cable, at the time of the tightening of the screws.

7. An aerial splicebox, in accordance with claim 6, having bottom windows formed inside of a housing formed externally to the base and inside of a peripheral lid which protrudes from the peripheral wall of the base, and the sealing element placed inside of the housing, and each one of the two parts of the pressing element has a external peripheral region sited against the peripheral lid of the housing.

8. An aerial splicebox, in accordance with claim 1, wherein the base that articulates in it has a connector tray having a front face turned to the cover and a back face turned to the interior of the base, with said connector tray carrying several connectors, each one presenting a terminal entry in the back face, in order to receive an optic fiber derived from the optic cable, and an exit terminal in the front face, in order to receive the fitting of the respective drop cables.

9. An aerial splicebox, in accordance with claim 8, wherein connectors are in a tilted position in relation to the connector tray, with the exit terminals turned to the top windows and to the cover.

10. An aerial splicebox, in accordance with claim 8, having a base which also articulates in it a splice tray having a front face, turned to the connector tray and carrying means of accommodation for the optic fibers and a back face turned to the interior of the base.

11. An aerial splicebox, in accordance with claim 10, wherein the splice tray which has its back face defining, with the base, a bottom housing, to the interior from which as through openings of the sealing element are opened, as well as and the bottom windows of the base, and a front face of the splice tray which defines, with the back face of the connector tray, an intermediary housing, inside of which optic fiber extensions are placed, each connected to a terminal entry of the respective optic connector.

12. An aerial splicebox, in accordance with claim 10, further comprising a top housing, defined between a front face of the connector tray and the cover and to the interior of which the top windows of the base are opened.

13. An aerial splicebox, in accordance with claim 12, having its top windows receiving the tight fitting of grommets within them, each one of which provided with passing orifices which open from the top from the grommets, for the airtight passing of the respective drop cables, with said passing orifices being open to the top housing of the splicebox.

14. An aerial splicebox, in accordance with claim 10, wherein the connector tray and the splice tray have their geometric hinge axles placed inside the base and parallel to the hinge axle of the cover to the base.

15. An aerial splicebox, in accordance with claim 1, wherein the fastener includes a lever articulated in the region of the second end of the belt and which articulates, in the middle, with the end of a locking arm having a free end to be engaged to the bipartite opposed end of the ring-shaped handle, in such a way as to press the latter against the said second end of the belt when a lever is moved to the locking position.

16. An aerial splicebox, in accordance with claim 1, wherein the hinge of the cover to the base is defined in respective portions confronting the external flange of the base and surrounding flange of the cover.

\* \* \* \* \*